United States Patent [19]

Perrault

[11] Patent Number: 5,425,531
[45] Date of Patent: Jun. 20, 1995

[54] INNER AND OUTER CONICAL SPRING SECTIONS WITH AXIALLY MOVABLE PLUG

[76] Inventor: George G. Perrault, 13491 Coleen, Warren, Mich. 48089

[21] Appl. No.: 294,902

[22] Filed: Aug. 24, 1994

[51] Int. Cl.⁶ .............................................. F16F 1/06
[52] U.S. Cl. .................................. 267/180; 267/290; 267/166.1
[58] Field of Search ................... 267/4, 286, 287, 288, 267/289, 290, 166.1, 168, 169, 180

[56] References Cited

U.S. PATENT DOCUMENTS

| | | | |
|---|---|---|---|
| 653,155 | 7/1900 | Tilden | 267/180 X |
| 2,026,909 | 1/1936 | Nallinger | 267/289 |
| 3,286,960 | 11/1966 | Douglas et al. | 267/180 X |
| 3,727,902 | 4/1973 | Burckhardt et al. | 267/166.1 |
| 3,901,494 | 8/1975 | Sena | 267/289 |
| 4,810,231 | 3/1989 | Weissenberger et al. | 267/180 X |

FOREIGN PATENT DOCUMENTS

| | | | |
|---|---|---|---|
| 3625101 | 2/1988 | Germany | 267/290 |
| 1587257 | 8/1990 | U.S.S.R. | 267/286 |

*Primary Examiner*—Josie A. Ballato
*Attorney, Agent, or Firm*—Harness, Dickey & Pierce

[57] ABSTRACT

A spring system comprising an axially movable, generally conically shaped plug having a flange on its larger diameter end, and a coil spring, within which the plug is axially arranged, formed in two co-axial integral inner and outer coil spring sections. The spring inner section coils having diameters which are sized to closely conform to the portions of the outer surface of the plug which they overlay, and the spring outer section coils surrounding and being radially spaced from the inner section of the spring. The free end of the inner section is fixedly anchored to a support member and the free end of the outer section engages a support surface. The sections are integrally connected by a common coil arranged to engage the plug flange. When the plug is initially moved endwise within the spring, the coils of the inner section are tightened and stretched around the conically shaped plug surface. Further movement of the plug compresses the outer spring section between the plug flange and the support surface.

10 Claims, 1 Drawing Sheet

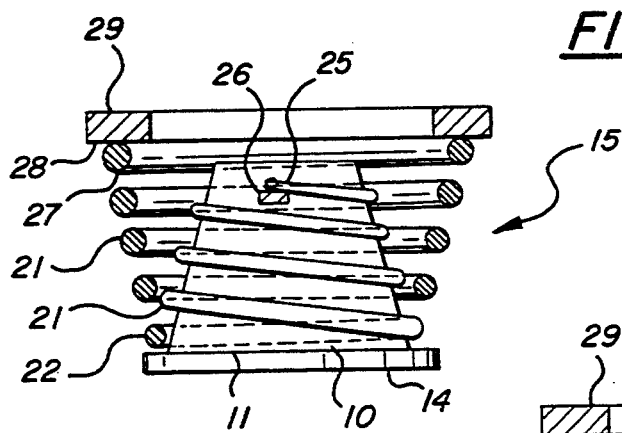
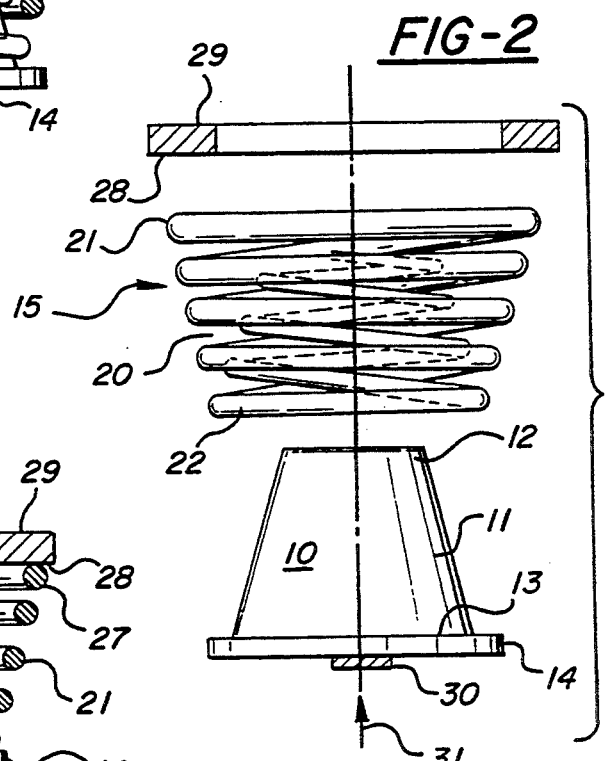
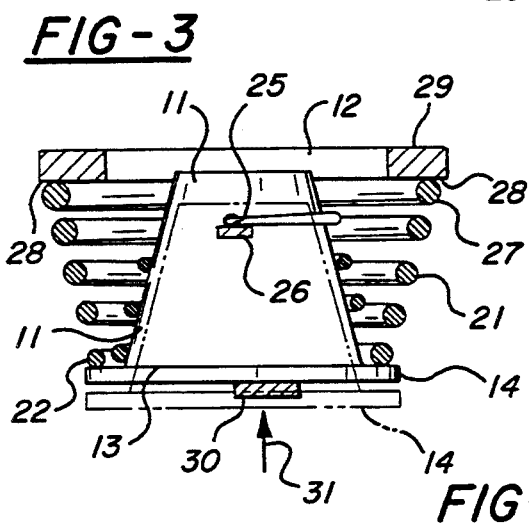
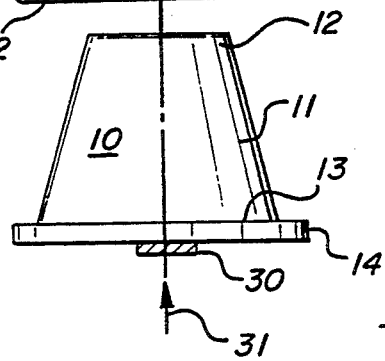
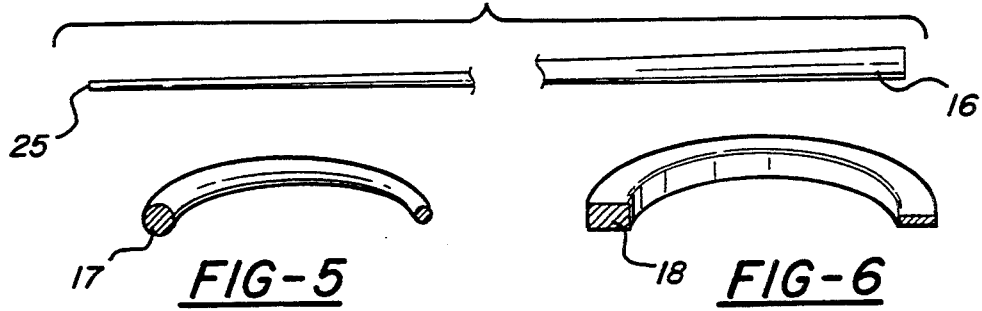
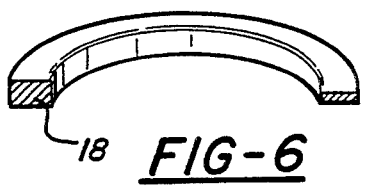

INNER AND OUTER CONICAL SPRING SECTIONS WITH AXIALLY MOVABLE PLUG

BACKGROUND OF INVENTION

This invention relates to an improved spring system which combines a tension spring function with a compression spring function that operate in response to the endwise movement of a plug extending through a two-section, coil spring.

Coil springs are commonly used for resiliently supporting or resiliently separating various types of articles or machine elements. Typically, the coil spring is arranged between a pair of relatively movable surfaces or elements which, upon moving together, compress the spring. Release of the pressure of the elements results in the spring resiliently returning to its initial size. The elements between which the spring is compressed, may comprise a plug-like member which fits within, and holds the coil spring and a support member. The two members are relatively movable; that is, one moves towards and away from the other.

This invention concerns forming the coil spring as an outer coil section which surrounds an inner coil section. The inner section is wrapped around a conically shaped plug so that endwise movement of the plug within the surrounding spring sections engages and resiliently stretches the inner coil section before the outer coil section compresses. This combines the effects of tension, due to the inner coil section, with compression provided by the outer coil section. This dual or composite coil spring arrangement provides a relatively compact, strong spring, as compared with conventional coil springs, which has many uses.

SUMMARY OF INVENTION

This invention contemplates providing a coil spring which is wound into an inner spring section that is surrounded by an integral outer spring section. The sections are fitted around and are co-axial with a tapered plug. The plug may be in the form of a conical or truncated conical shape which is arranged to move endwise within the surrounding spring sections. The outer, conical shaped or tapered shaped surface of the plug is arranged to engage the coils of the inner spring section, whose coils progressively increase in diameter for overlaying the plug surface. The inner and the outer spring sections are integrally connected by a common coil which is arranged to engage a radially outwardly formed flange on the large end of the plug. The free end of the inner coil section is anchored to a fixed support and the free end of the surrounding outer coil section is engaged with a support surface. The coil spring may be formed of an elongated strand which is tapered, that is, which gradually increases in cross-sectional size, along its length, but which has a substantial uniform cross-section.

When force is applied to the plug, it moves endwise within the surrounding coil springs and tightly engages the surrounding coils of the inner spring for applying a tension or a stretch to these inner coils. Continued movement of the plug results in the common coil engaging the flange on the plug so that further movement of the plug compresses the outer section between the flange and the support surface. Hence, the movement of the plug initially provides a tension or stretching effect on the inner section and, thereafter, provides a compression effect upon the outer section.

One object of this invention is to provide a spring system which produces a greatly increased resilient biasing arrangement within a compact space using a relatively inexpensive spring. That is, the spring force that results from the movement of the plug towards the support surface is greatly increased due to the composite inner and outer spring sections and the engagement of the inner spring section coils with the surface of the moving plug.

A further object of this invention is to provide a relatively inexpensive, strong and simply constructed spring arrangement for use in places where relatively strong springs are required. As examples, the spring can be used as part of the suspension or wheel supports on railway cars or to resiliently support large and heavy machinery or containers. Similarly, the spring can be used in other places where heavy duty compact springs are required.

Still a further object of this invention is to provide an inexpensive spring system whose spring resistance greatly increases, beyond a normally expected amount, as the spring is compressed between a pair of relatively movable objects.

These and other objects and advantages of this invention will become apparent upon reading the following description, of which the attached drawings form a part.

DESCRIPTION OF DRAWINGS

FIG. 1 schematically illustrates an elevational view of the composite spring assembly.

FIG. 2 illustrates, schematically, an elevational view of the spring, with the parts disassembled.

FIG. 3 illustrates a schematic view, in elevation, showing the movement of the plug relative to the spring sections.

FIG. 4 is an enlarged, fragmentary view showing the tapering of the strand forming the coil spring.

FIG. 5 illustrates a fragmentary section of a coil whose cross-sectional shape is constant but whose cross-sectional size increases along its length.

FIG. 6 is a view similar to FIG. 5, but showing a spring strand which is of a polygonal cross-sectional shape.

DETAILED DESCRIPTION

As illustrated in FIGS. 1 and 2, the spring system includes a tapered or sloped plug 10. The plug may be made in a generally conical or truncated conical shape to provide a conical outer surface 11. This conical or tapering arrangement provides the plug with a narrow end 12 and a large end 13. A radially outwardly extending flange 14 is formed upon the large end 13. The flange may be either a complete annular member, surrounding the plug, or may be formed as partial or discontinuous flange elements.

The plug fits within and is surrounded by a double coil spring 15. Preferably, the spring is formed of an elongated, tapered strand 16 (see FIG. 4). The strand may be made of resilient, wire-like metal or plastic material. Preferably, the strand is of substantially uniform cross-sectional shape but, the size of the cross-sectional shape may continuously vary to provide the desired taper along the length of the strand. The cross-sectional shapes may be varied, depending upon the results desired. For example, the strands may have a circular cross-sectional shape 17 (see FIG. 5). Alternatively, the strands may have a polygonal cross-sectional shape of 18 (see FIG. 6). However, the strand may be of a substantially uniform cross-sectional size and shape throughout its length.

The spring is formed with an inner, coil section 20, which is surrounded by an outer coil section 21. The two sections are integrally joined together by a common coil 22. The inner section coils increase in diameter along the length of the coil for closely fitting around and for engaging the plug 10, during movement of the plug. The outer section coils may also increase in diameter from the common coil 22 to the free end of the outer section. Alternatively, the outer section may utilize a substantially constant coil diameter.

As illustrated in FIGS. 1 and 3, the common coil 22 is arranged to engage the flange 14 of the plug when the plug is axially moved within the surrounding spring.

The free end 25 of the inner coil section, which is of the smallest cross-sectional size of the strand, is secured to a fixed anchor or support 26. The outer section free coil 27 is arranged to engage against or to be connected to a support surface 28. The surface may vary in size or in shape and, therefore, for illustration purposes, it is shown as a surface formed upon a ring 29. Similarly, the fixed anchor 26 could be formed upon the same ring or upon an adjacent member (not shown).

The plug is arranged to be engaged by a pressure applying member 30 which is schematically shown. When pressure is applied to the plug large end 13, the plug moves endwise or axially, within the surrounding spring sections. When the plug is moved, as indicated by the arrow 31 in FIG. 3, the surrounding coils of the inner coil section tightly engage against the tapered outer surface of the plug. Continuing endwise movement of the plug tends to stretch or to apply a longitudinal force upon the strand portion which defines the coils that engage the plug. This provides a tension or a hoop-like force in the wire of the coils surrounding the moving plug.

Continued movement of the plug results in the common coil 22 tightly engaging the flange 14. Then, further movement of the plug results in compressing the outer section 21 between the plug flange 14 and the support surface 28. This provides a resilient compressive force which is added to the resilient tension force of the inner section. Where the spring is formed of a tapered strand, the spring force increases accordingly during the continued movement of the plug within the spring.

As can be seen, this composite spring system provides a compact device which is relatively inexpensive and is simple in construction. The system can be used in places where substantial spring forces are required but where space for the spring is limited. Thus, the uses of this system may be varied. As mentioned above, examples for such uses, can be the springing system of a railroad car wheel suspension or the spring used to separate railroad cars and to absorb the forces when such cars are impacted together for coupling the cars. The springs could be made of a strand formed of suitable plastic material or could be made hollow plastic or metal material. As another alternative, the springs may be made of a mixture of sintered, powdered metal and plastic. The use of such materials would reduce the weight of the assembly. The selection of the particular material can be made of those skilled in the art, based upon that strength and resiliency required and the cost limitations.

The sizes and the shapes of the spring and plug elements may be varied considerably, depending upon the particular use and the spring forces needed for that use. Thus, the foregoing description should be read as being merely illustrative of an operative embodiment of this invention and not in a strictly limiting sense.

Having fully described an operative embodiment of this invention,

I now claim:

1. A spring system comprising:

an axially movable plug formed with a generally conically shaped outer surface which provides the plug with a wide base end portion and a narrow inner end portion;

a radially outwardly extending flange formed on the base end portion of the plug;

a spring formed of an elongated strand made of a springy, wire-like material, wound into coils to form an inner coil spring section and an outer coil spring section integrally joined together by a common coil, with the outer spring section being coaxial with and surrounding the inner spring section and plug;

the inner spring section overlaying and closely surrounding the plug outer surface from about the plug narrow inner end portion to about the plug flange, so that the successive coils of the inner spring section increase in diameter for closely conforming to the portions of the plug outer surface which the respective coils overlay;

with the common coil being located adjacent the plug flange;

the outer spring section generally extending along the length of the plug, around and spaced from the plug and the inner spring section, with the outer spring section having a free end coil engaged with a support surface;

a free inner end of the inner spring section being engaged with a support;

the plug and said support surface being movable relatively towards and away from each other for applying a compressive force, in the generally axially direction of the plug and spring sections, whereby the coils of the inner spring section tightly engage the surface of the plug as the plug relatively moves within the inner spring section for resiliently stretching the inner spring coils around the plug outer surface and for compressing the outer section coils axially between the plug flange and said support surface.

2. A spring system as defined in claim 1, and said elongated spring strand being tapered along its length so that its cross-sectional shape continuously increases in size from the free end of the inner spring section to the free end of the outer spring section.

3. A spring system as defined in claim 1, and the diameter of the coils of the outer spring section gradually increasing from the common coil to the free end coil of the outer spring section.

4. A spring system as defined in claim 1, and with the common coil which integrally joins the inner and the outer spring sections being arranged to engage and to be pushed in an axial direction, by the plug flange after the coils of the inner spring section are tightly engaged and are resiliently stretched by the plug outer surface.

5. A spring system as defined in claim 4, and including said elongated spring strand being gradually tapered along its length from the free end of the inner spring section to the free end of the outer spring section so that its cross-sectional shape continually increases in size.

6. A spring system as defined in claim 5, and including the spring strand being generally circular in cross-section.

7. A spring system as defined in claim 5, and including said spring strand being polygonal in cross-section.

8. A spring system as defined in claim 5, and including the diameter of each of the coils of the outer spring section gradually increasing, from coil-to-coil, from the common coil which engages the plug flange to the end coil which engages said support surface.

9. A spring system as defined in claim 1, and said support surface being fixed and said plug being movable under a load applied thereto in a direction towards said support surface.

10. A spring system as defined in claim 1, and with the common coil which integrally connects the inner section and the outer section of the spring, being sized to engage and to be pushed axially by the plug flange when the inner spring section coils are tightly engaged with and are stretched by the plug outer surface;

and said support surface being fixed with said plug being axially movable under a load applied thereto in the axial direction.

* * * * *